United States Patent [19]

Friedow

[11] Patent Number: 4,811,994

[45] Date of Patent: Mar. 14, 1989

[54] HYDRAULIC BRAKE SYSTEM

[75] Inventor: Michael Friedow, Tamm, Fed. Rep. of Germany

[73] Assignee: Robert Bosch GmbH, Stuttgart, Fed. Rep. of Germany

[21] Appl. No.: 126,077

[22] Filed: Nov. 24, 1987

[30] Foreign Application Priority Data

Jan. 31, 1987 [DE] Fed. Rep. of Germany ....... 3702906

[51] Int. Cl.$^4$ .............................................. B60T 8/32
[52] U.S. Cl. .................................. 303/115; 188/180; 74/3; 303/113
[58] Field of Search ................ 303/115, 113; 188/180, 188/181 A, 181 C; 74/3, 3.2; 192/105 A, 103 A, 105 C, 105 CP

[56] References Cited

U.S. PATENT DOCUMENTS

| 4,083,609 | 4/1978 | Cochran | 303/96 |
| 4,152,030 | 5/1979 | Blomberg et al. | 303/115 |
| 4,715,665 | 12/1987 | Ostwald | 303/115 |

FOREIGN PATENT DOCUMENTS 1258734  9/1986  U.S.S.R. .............................. 188/180

Primary Examiner—Andres Kashnikow
Assistant Examiner—Matthew C. Graham
Attorney, Agent, or Firm—Edwin E. Greigg

[57] ABSTRACT

A hydraulic brake system having a hydraulic cylinder including a piston used for brake pressure modulation disposed between a master brake cylinder and at least one wheel brake cylinder in which the piston of the hydraulic cylinder is actuated mechanically by an electric-motor-driven centrifugal positioner. In an anti-skid system, the hydraulic cylinder can be used in combination with the centrifugal positioner for rapid reduction of brake pressure. It is also possible to embody the hydraulic cylinder and centrifugal positioner such that a brake boosting or anti-slip regulation takes place upon actuation of the centrifugal positioner. By the use of a centrifugal positioner, the piston can be displaced quickly and very precisely for either increasing or reducing brake pressure.

21 Claims, 5 Drawing Sheets

22'

24'

HYDRAULIC BRAKE SYSTEM

BACKGROUND OF THE INVENTION

The invention relates to a hydraulic brake system as defined hereinafter.

Hydraulic brake systems, as they are used in motor vehicles, have a master brake cylinder that is mechanically actuated by a brake pedal, causing the buildup of a corresponding brake pressure in the brake lines leading to the wheel brake cylinders. To prevent locking of the wheels, or skidding, so-called anti-lock or anti-skid brake systems (ABS) are known, in which the brake pressure is reduced as soon as skidding is detected or is at least imminent. To this end, a hydraulic cylinder disposed between the master brake cylinder and the wheel brake cylinder can be provided, the piston of which, by mechanical actuation, effects a lowering or modulation of brake pressure. The additional hydraulic cylinder may also be disposed such that an increasing of brake pressure is attained when it is mechanically actuated. In that case, the hydraulic cylinder functions as a brake booster. A buildup of brake pressure at the driven wheels that is independent of the driver offers the opportunity for anti-slip regulation (ASR).

U.S. Pat. No. 4,083,609 discloses a hydraulic cylinder the piston of which is displaceable via its piston rod by a positioning mechanism embodied as an electromagnet. However, the use of an electromagnet as the positioning mechanism has the disadvantage that the system is relatively sluggish and is unsuited to relatively large piston deflections and cannot bring to bear the great forces appropriate for the pressures involved.

OBJECT AND SUMMARY OF THE INVENTION

The new hydraulic brake system disclosed herein has the advantage over the prior art that an electric-motor-driven centrifugal positioner can be accelerated quickly and makes great tractive or pressure forces possible. The tractive or pressure forces can also be apportioned very sensitively by means of appropriate speed governing.

The piston disposed in the hydraulic cylinder can be supported in floating fashion, with the piston communicating on one end wiht the master brake cylinder and on the other end with one or more wheel brake cylinders. If the master brake cylinder is now actuated, then the piston inside the cylinder shifts out of its position of repose, causing the pressure in the brake lines leading to the wheel brake cylinders to be increased. If there is a tendency to skidding or wheel locking, this can be detected by a well known electronic anti-skid system, and the electric motor associated with the centrifugal positioner can be put into operation via electrical control switches. With the tractive or pressure forces derived from the centrifugal positioner, the floatingly supported piston is thereby moved at least slightly toward its outset position, causing a corresponding pressure drop in the brake lines leading to the wheel brake cylinders and preventing locking of the wheels.

The centrifugal positioner may be embodied in a manner known per se, such that it converts centrifugal force into tractive or pressure forces. Via articulated levers, the forces of rotation are converted into translational forces. Spring elements may also engage the centrifugal positioner, causing it to assume a defined final position when at a standstill.

The hydraulic cylinder may also be connected to a branch brake line, in order to effect a brake pressure increase, or optionally a brake pressure reduction, when the hydraulic cylinder is actuated by means of the centrifugal positioner.

The use of a centrifugal positioner has the advantage of high adjustment speed or dynamics, as compared with conventional systems, because the centrifugal positioner always works in one rotational direction. if the engine fails, the brake system according to the invention has the advantage that normal braking action is unimpaired. In this system, it is also unnecessary to monitor the outset position, because as a result of the spring-actuated restoration, the outset position is always automatically reached. With this system, a desired nonlinear transition between normal operation and anti-slip regulation is also possible.

The invention will be better understood and further objects and advantages thereof will become more apparent from the ensuing detailed description of preferred embodiments taken in conjunction with the drawings.

DESCRIPTION OF THE PREFERRED EXEMPLARY EMBODIMENT

Figure 1:
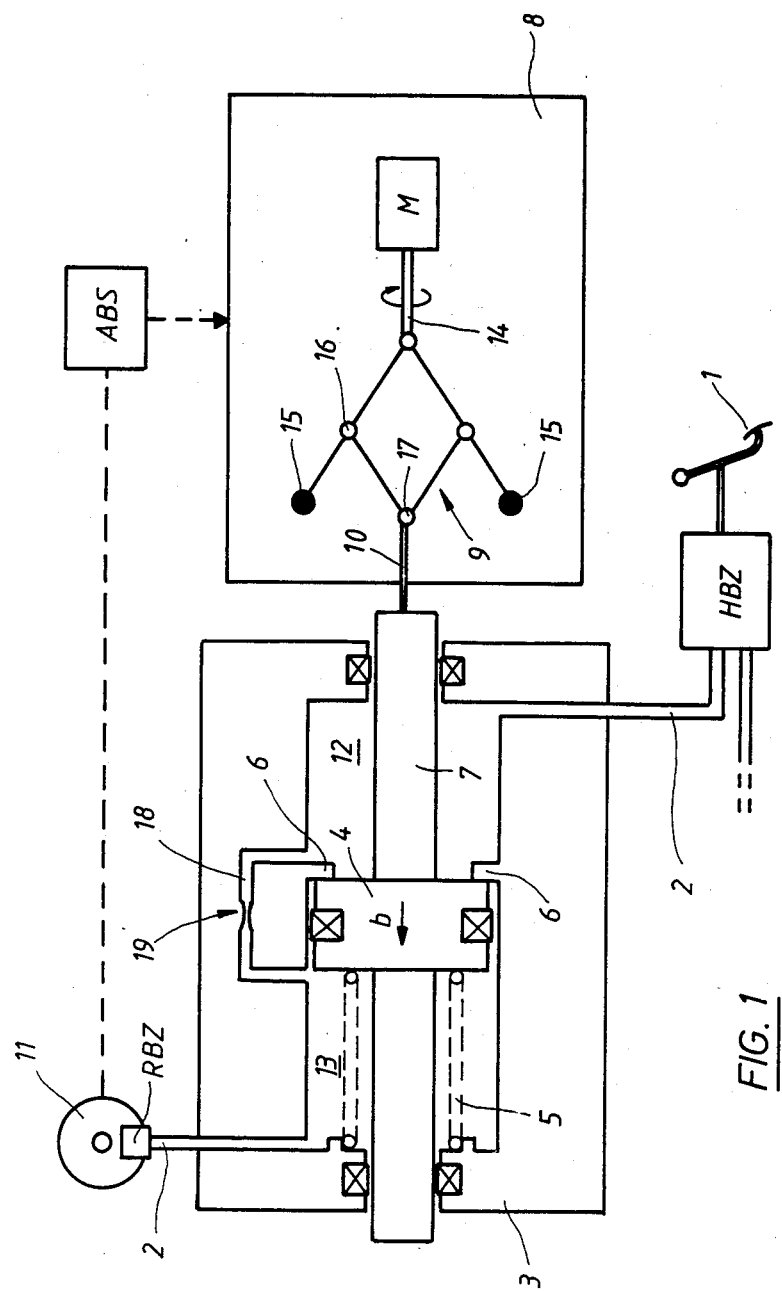
FIG. 1 shows a hydraulic brake system having an additional hydraulic cylinder, the piston of which is disposed in a floating manner and is mechanically displaceable via a centrifugal positioner that generates tractive forces.

In the brake system shown in FIG. 1, one of a plurality of wheel brake cylinders RBZ and the master brake cylinder HBZ, which is actuatable from a foot pedal 1, are shown. An additional hydraulic cylinder 3 is incorporated into the brake line 2 leading from the master brake cylinder HBZ to the wheel brake cylinder RBZ and has a floatingly supported piston 4. In its position of repose, the piston 4 is pressed against a stop 6 by a compression spring 5. Via a piston rod 7, the piston 4 is connected to a positioning device 8, which has a centrifugal positioner 9 that is actuated by an electric motor M. The positioning device 9 also prevents rotation of the piston 7 relative to the tie rod 10. The tie rod 10 is provided between the piston rod 7 and the centrifugal positioner 9 for transmitting the tractive forces generated by rotations of the centrifugal positioner 9.

The electric motor M is controlled by an anti-skid system ABS, which in a manner known per se monitors locking or a tendency to locking at the wheels 11 and detects locking, if it occurs. If by actuation of the foot pedal 1, the brake pressure in the chamber 12 of the hydraulic cylinder 3 oriented toward the master brake cylinder HBZ is increased, this causes the displacement of the piston 4 in the direction of the arrow b, causing the generation of a corresponding brake pressure in the chamber 13. If the brake pressure in the chamber 13 reaches a value that causes locking of one of the wheels 11, then the electric motor M is put into operation by a signal from the anti-skid system ABS represented in block form. By this means, via the motor shaft 14, the centrifugal adjuster 9 is made to rotate, so that its flyweights 15 are moved outward. Via rotary articulations 16, 17 and via the tie rod 10, the piston 4 is thus retracted counter to the direction of the arrow b, resulting in a lowering of the brake pressure in the chamber 13 at the wheel brake cylinders RBZ. Once the braking event is over, the spring 5 returns the piston 4 to the position shown.

The bypass 18 that is operative between the chambers 12 and 13 has a very severe taper 19, which allows only a long-term pressure equalization or volumetric equalization between the chambers 12 and 13. For the duration of a braking event, this bypass 18 has only a negligible effect on the operability of the system.

Figure 2:
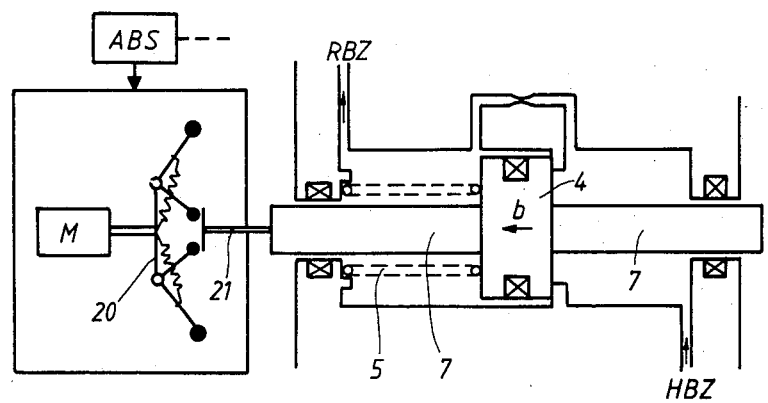
FIG. 2 shows an arrangement corresponding to FIG. 1, but in which a centrifugal positioner that generates pressure forces is used.

In the embodiment of a brake system shown in FIG. 2, instead of a centrifugal positioner that generates tractive force, a centrifugal positioner 20 is used that upon rotation exerts pressure via a pressure rod 21 upon the piston rod 7. Otherwise, the function of this brake system is identical to that of the brake system shown in FIG. 1.

Figure 3:
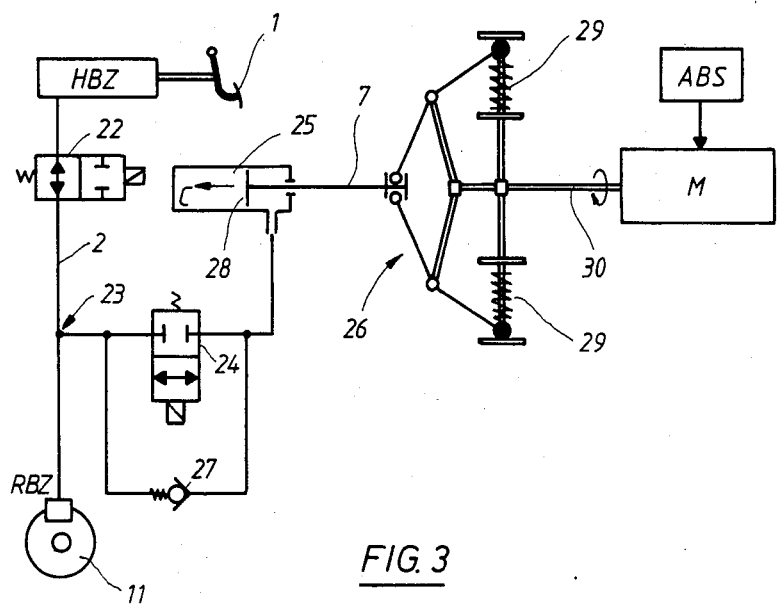
FIG. 3 shows a brake system in which the additional hydraulic cylinder is connected to a branch of the brake line.

In FIG. 3, another exemplary embodiment is shown, in which the master brake cylinder HBZ communicates with the wheel brake cylinders RBZ via a first electromagnetic stop valve 22. An additional hydraulic cylinder 25, the piston of which is actuatable by means of a centrifugal positioner 26, is connected via a second electromagnetic stop valve 34 to a branch 23. The centrifugal positioner 26 is driven by an electric motor M, which once again is controlled by an anti-skid system ABS. The second stop valve 24 is bridged by means of a check valve 27.

If the master brake cylinder is actuated via the foot pedal 1, the pressure in the brake line 2 rises until such time as a tendency to locking, or locking itself, at the wheel 11 is detected by the anti-skid system ABS. The valve 22 is thereupon closed, and the valve 24 is opened to reduce the brake pressure. The piston 28 located in the hydraulic cylinder 25 is now moved by the brake pressure in the direction of the arrow c, counter to the force of the springs 29, resulting in a reduction of brake force. If the motor shaft 30 is now set into rotation by the electric motor M, the flyweights of the centrifugal positioner move outward in response to the rotation and return the piston 28. This return can also take place with the valve closed, since when the master brake cylinder HBZ is not actuated the brake fluid can be returned via the check valve 27.

Figure 3A:
FIGS. 3a and 3b show versions of specialized valves for the brake system shown in FIG. 3.
Figure 3B:

In FIG. 3a and FIG. 3b, two versions of 2/2-way valves 22' and 24' are shown, which can be used instead of the valves 22, 24 used in FIG. 3. By using these valves, the check valve 27 (FIG. 3) can be dispensed with.

Figure 4:
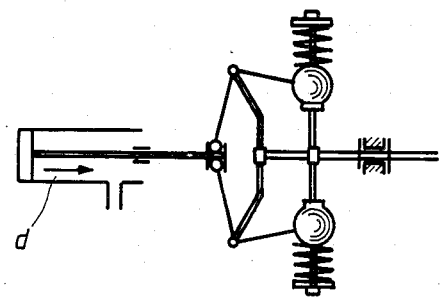
FIGS. 4 and 5 show two exemplary embodiments of centrifugal positioners.

In FIG. 4, a further variant of a centrifugal positioner is shown, in which the flyweights move outward counter to spring forces, and the piston located in the cylinder is moved in the direction d. In contrast to the embodiments shown in FIGS. 1–3, this variant is used not to effect a primary pressure reduction, but rather a pressure buildup, thereby acting as the pressure producing means of a drive slip regulation system or brake booster.

Figure 5:
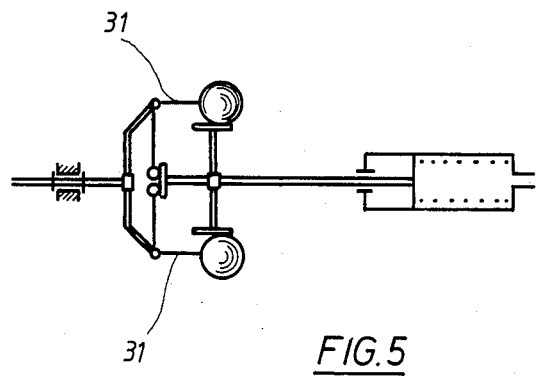

FIG. 5 shows a version of a centrifugal positioner in which pressure can be exerted upon the piston via articulated rotary cranks 31. For this embodiment, the effect is again as described for FIG. 4.

Figure 6:
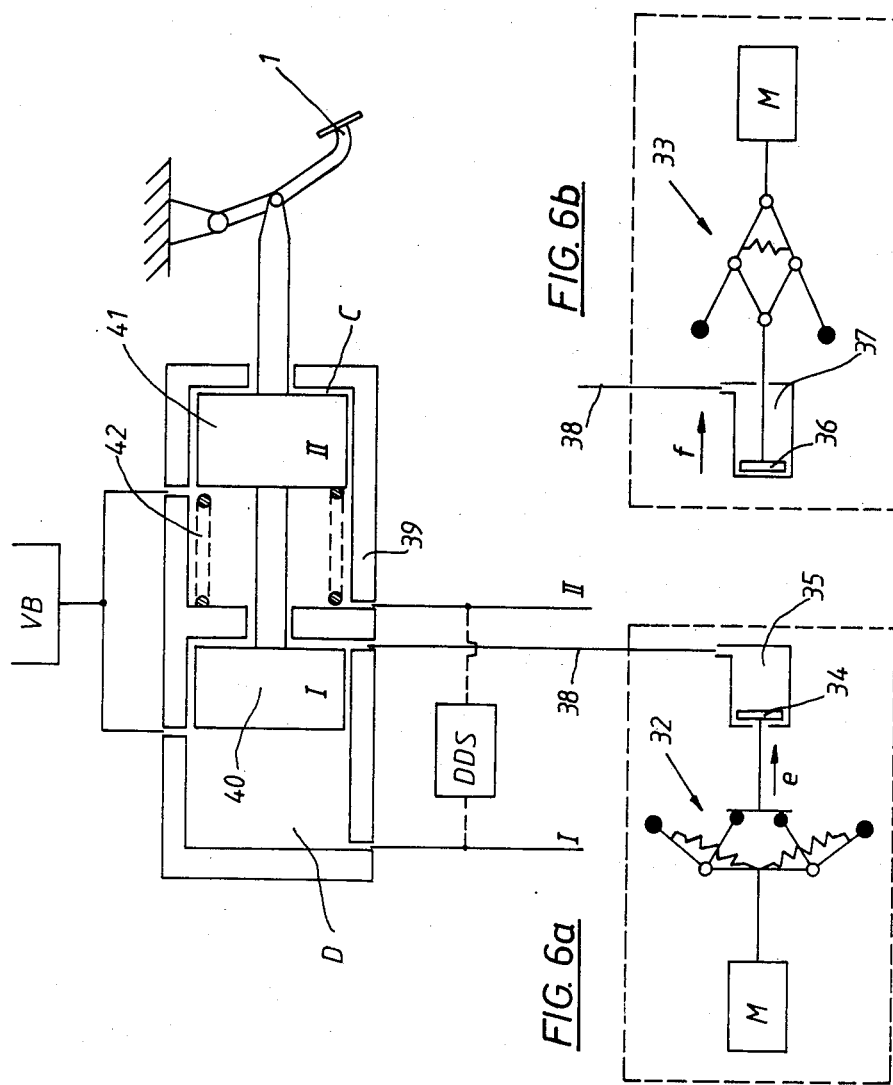
FIGS. 6a, 6b and 7 show further exemplary embodiments in each of which a centrifugal positioner is associated with the master brake cylinder.

In the hydraulic brake system shown in FIG. 6a, a centrifugal positioner 32 is used which upon rotation displaces the associated piston 34 in the hydraulic cylinder 35 in the direction of the arrow e. Instead of the centrifugal positioner 32, the centrifugal positioner 33 shown in FIG. 6b can be used, which upon rotation moves the piston 36 connected to it in the direction of the arrow f. In both cases, upon rotation of the centrifugal positioner, a buildup of pressure in the hydraulic cylinders 35, 37 is attained. Via hydraulic lines 38, the hydraulic cylinders 35, 37 communicate with the master brake cylinder 39, which contains two rigidly coupled pistons 40, 41, which can be actuated by means of a pedal 1 counter to a spring 42. The annular chamber C associated with the piston 41, like the annular chamber D, communicates with a hydraulic supply container VB.

In a manner known per se, a differential pressure switch DDS can recognize a circuit failure if a predetermined pressure difference between the annular chambers C and D is exceeded and can trigger a warning signal; optionally, it can also effect a limitation of the boosting action, to counter the danger of overbraking or of a pressure overload on the intact circuit.

With the centrifugal positioners 32, 33, highly dynamic brake pressure modulation is attainable.

Figure 7:
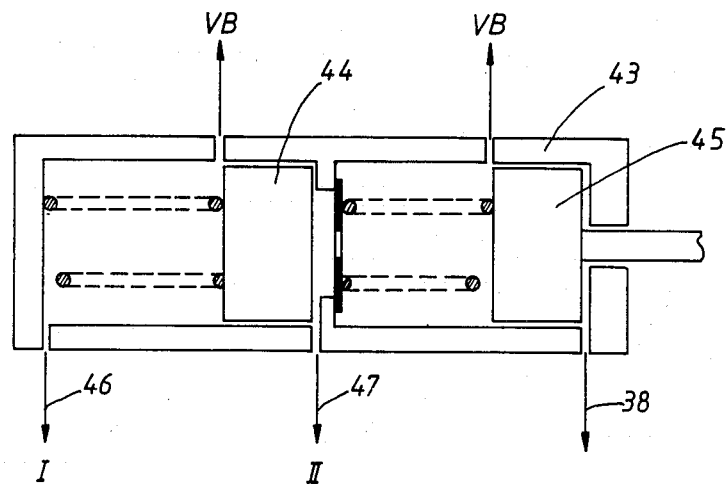

A further exemplary embodiment shown in FIG. 7 has a master brake cylinder 43 the pistons 44 and 45 of which are not coupled rigidly together. That is, a conventional masterbrake cylinder can be used, which can communicate via a hydraulic line 38 with centrifugal positioners 32, 33 such as those shown in FIG. 6a. The hydraulic lines 46, 47 lead to the brake circuits I, II.

The foregoing invention relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic brake system having a hydraulic control cylinder used for brake pressure modulation when disposed between and connected to a master brake cylinder and at least one wheel brake cylinder, said hydraulic control cylinder includes a piston which is connected via a piston rod to an electromechanical positioning mechanism, said electromechanical positioning mechanism includes a motor and a centrifugal positioner (9, 20, 26) driven by an electric motor (M), said centrifugal positioner converts rotational forces into tractive pressure forces which engage said piston rod to counteract a pressure on said piston rod produced by fluid from a master brake cylinder connected thereto.

2. A hydraulic system as defined by claim 1, in which said piston (4) has two faces and is floatingly supported on one of its two faces, a compression spring (5), which acts on one of said two faces moves the piston into a defined position of repose, said hydraulic control cylinder (3) includes means for communicating on one face side of said piston (4) with said master brake cylinder (HBZ) of the hydraulic brake system and on the other face side of the piston with a brake line (2) leading to said at least one wheel brake cylinder (RBZ).

3. A hydraulic brake system as defined in claim 2, in which said centrifugal positioner includes flyweights (15) connected via articulated cranks to the piston rod (7), which flyweights are pressed into a final position by means of at least one spring when in a normal state.

4. A hydraulic brake system as defined by claim 2, in which said hydraulic brake system is used as a brake booster, said motor and said centrifugal positioner (9, 20, 26) being operated to displace the piston for braking of the wheels (11) in a direction such that the pressure in the brake lines (2) leading to the wheel brake cylinders (RBZ) increases.

5. A hydraulic brake system as defined by claim 2, in which said hydraulic brake system includes an anti-skid system, said motor and said centrifugal positioner (9, 20, 26) are operated to displace the piston (4), if locking of the wheels (11) is detected, in a direction such that pressure in the brake lines (2) leading to the wheel brake cylinders (RBZ) decreases.

6. A hydraulic brake system as defined by claim 5, in which said centrifugal positioner includes flyweights (15) connected via articulated cranks to the piston rod (7), which flyweights are pressed into a final position by means of at least one spring when in a normal state.

7. A hydraulic brake system as defined by claim 2, in which said hydraulic brake system includes an anti-slip system said motor and said centrifugal positioner (9, 20, 26) are operated to displace the piston for brakign of the wheels (11) in the direction such that the pressure in the brake lines (2) leading to the wheel brake cylinders (RBZ) increases.

8. A hydraulic brake system as defined by claim 7, in which said centrifugal positioner includes flyweights (15) connected via articulated cranks to the piston rod (7), which flyweights are pressed into a final position by means of at least one spring when in a normal state.

9. A hydraulic brake system as defined by claim 1, in which said hydraulic brake system includes an anti-skid system, said motor and said centrifugal positioner (9, 20, 26) are operated to displace the piston (4), if locking of the wheels (11) is detected, in a direction such that pressure in the brake lines (2) leading to the wheel brake cylinders (RBZ) decreases.

10. A hydraulic brake system as defined by claim 9, in which said master brake cylinder (42, 43) includes a pair of pistons (41, 40; 45, 44) disposed in two adjacent annular chambers (C, D), said pair of pistons are coupled to one another and communicate hydraulically with said hydraulic control cylinder.

11. A hydraulic brake system as defined by claim 9, in which said centrifugal positioner includes flyweights (15) connected via articulated cranks to the piston rod (7), which flyweights are pressed into a final position by means of at least one spring when in a normal state.

12. A hydraulic brake system as defined by claim 11, in which said master brake cylinder (42, 43) includes a pair of pistons (41, 40; 45, 44) disposed in two adjacent annular chambers (C, D), said pair of pistons are coupled to one another and communicate hydraulically with said hydraulic control cylinder.

13. A hydraulic brake system as defined by claim 1, in which said hydraulic brake system includes an anti-slip system, said motor and said centrifugal positioner (9, 20, 26) being operated to displace the piston for braking of the wheels (11) in a direction such that the pressure in the brake lines (2) leading to the wheel brake cylinders (RBZ) increases.

14. A hydraulic brake system as defined by claim 13, in which said master brake cylinder (42, 43) includes a pair of pistons (41, 40; 45, 44) disposed in two adjacent annular chambers (C, D), said pair of pistons are coupled to one another and communicate hydraulically with said hydraulic control cylinder.

15. A hydraulic brake system as defined by claim 13, in which said centrifugal positioner includes flyweights (15) connected via articulated cranks to the piston rod (7), which flyweights are pressed into a final position by means of at least one spring when in a normal state.

16. A hydraulic brake system as defined by claim 15, in which said master brake cylinder (42, 43) includes a pair of pistons (41, 40; 45, 44) disposed in two adjacent annular chambers (C, D), said pair of pistons are coupled to one another and communicate hydraulically with said hydraulic control cylinder.

17. A hydraulic brake system as defined by claim 1, in which said centrifugal positioner includes flyweights (15) connected via articulated cranks to the piston rod (7), which flyweights are pressed into a final position by means of at least one spring when in a normal state.

18. A hydraulic brake system as defined by claim 17, in which said master brake cylinder (42, 43) includes a pair of pistons (41, 40; 45, 44) disposed in two adjacent annular chambers (C, D), said pair of pistons are coupled to one another and communicate hydraulically with said hydraulic control cylinder.

19. A brake system as defined by claim 1, in which a brake line (2) leads from said master brake cylinder (HBZ) via a first electromagnetic stop valve (22) to at least one wheel brake cylinder (RBZ), said hydraulic control cylinder is connected by a pressure line between this stop valve (22) and the wheel brake cylinder (RBZ) to the brake lines (2), a second electromagnetic stop valve (24) is connected in said pressure line between said hydraulic control cylinder and said brake line, and said piston is actuated by said centrifugal positioner (26), and for rapid brake pressure reduction said first stop valve (22) closes and said second stop valve (24) opens and said piston (28) retreats counter to a spring force when the motor (M) is at a stop.

20. A hyraulic brake system as defined in claim 1, in which said master brake cylinder (42, 43) includes a pair of pistons (41, 40; 45, 44) disposed in two adjacent annular chambers (C, D), said pair of pistons are coupled to one another and communicate hydraulically with said hydraulic control cylinder.

21. A hydraulic brake system as defined by claim 1, in which said hydraulic brake system is used as a brake booster, said motor and said centrifugal positioner (9, 20, 26) being operated to displace the piston for braking of the wheels (11) in a direction such that the pressure in the brake lines (2) leading to the wheel brake cylinders (RBZ) increases.

* * * * *